United States Patent
Miki et al.

(10) Patent No.: US 9,503,594 B1
(45) Date of Patent: Nov. 22, 2016

(54) ELECTRONIC DEVICE, AND COMPUTER-READABLE NON-TRANSITORY RECORDING MEDIUM STORING DISPLAY CONTROL PROGRAM

(71) Applicant: KYOCERA Document Solutions Inc., Osaka (JP)

(72) Inventors: Shunji Miki, Osaka (JP); Chikako Kanno, Osaka (JP); Hiroshi Toyoda, Osaka (JP); Takeshi Miyazaki, Osaka (JP); Yuka Minami, Osaka (JP); Yuki Ikeda, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/097,469

(22) Filed: Apr. 13, 2016

(30) Foreign Application Priority Data

Apr. 28, 2015 (JP) .................................. 2015-092116

(51) Int. Cl.
G06F 3/12 (2006.01)
H04N 1/00 (2006.01)

(52) U.S. Cl.
CPC ...... *H04N 1/00411* (2013.01); *H04N 1/00384* (2013.01); *H04N 1/00389* (2013.01); *H04N 1/00474* (2013.01); *H04N 2201/0094* (2013.01)

(58) Field of Classification Search
CPC ...... H04N 1/00411; H04N 1/00384; H04N 1/00389; H04N 1/00474; H04N 2201/0094

USPC ......................................................... 358/1.15
See application file for complete search history.

(56) References Cited

U.S. PATENT DOCUMENTS

| 2012/0075652 | A1* | 3/2012 | Miyamoto | H04N 1/00384 358/1.13 |
| 2013/0027719 | A1* | 1/2013 | Tsuji | H04N 1/00424 358/1.9 |
| 2013/0265252 | A1* | 10/2013 | Sekiguchi | G06F 3/0488 345/173 |

FOREIGN PATENT DOCUMENTS

JP 2000-307834 A 11/2000

* cited by examiner

*Primary Examiner* — Allen H Nguyen
(74) *Attorney, Agent, or Firm* — IP Business Solutions, LLC

(57) ABSTRACT

An electronic device includes: a display section displaying function screens each including a plurality of function setting keys for receiving function settings; a first operation key for displaying the first function screen at the display section; a second operation key for displaying the second function screen at the display section; and a control section displaying, at the display section, the first and second function screens in accordance with operation performed on the first and second operation keys. The control section displays the first and second function screens at the display section when the first and second operation keys have been pressed simultaneously.

9 Claims, 16 Drawing Sheets

ELECTRONIC DEVICE, AND COMPUTER-READABLE NON-TRANSITORY RECORDING MEDIUM STORING DISPLAY CONTROL PROGRAM

INCORPORATION BY REFERENCE

This application claims priority to Japanese Patent Application No. 2015-092116 filed on Apr. 28, 2015, the entire contents of which are incorporated by reference herein.

BACKGROUND

This disclosure relates to an electronic device having a plurality of functions and a computer-readable non-transitory recording medium storing a display control program, and more specifically to a technology of improving an operational feeling upon collective execution of the plurality of functions.

With a multifunction peripheral combining a plurality of functions such as a copy function, a printer function, a scanner function, and a facsimile function, an operator can switch the various functions for use. However, to perform the plurality of functions consecutively, for example, to perform copying and facsimile transmission of the same document, it is inconveniently required to perform settings input operation separately for the copy operation and the facsimile transmission.

For example, disclosed is an image forming apparatus which has both a copy function and a facsimile function for which processing time is further shortened by performing document reading once, upon execution of the copy function and the facsimile function.

SUMMARY

As one aspect of this disclosure, a technology obtained by further improving the technology described above will be suggested.

An electronic device according to one aspect of this disclosure includes: a display section, a first operation key, a second operation key, and a control section.

The display section displays function screens each including a plurality of function setting keys for receiving function settings.

On the first operation key, an instruction for displaying the first function screen at the display section is inputted.

On the second operation key, an instruction for displaying the second function screen different from the first function screen at the display section is inputted.

The control section displays, at the display section, the first and second function screens in accordance with the instructions inputted on the first and second operation keys, and receives, in accordance with operation performed on the function setting keys, instructions corresponding to the function setting keys included on the first and second function screens displayed at the display section.

Further, the control section simultaneously displays both the first and second function screens at the display section when the first and second operation keys have been pressed simultaneously.

Moreover, another aspect of this disclosure is a computer-readable non-transitory recording medium storing a display control program.

The display control program makes the computer display, at a display section, function screens each including a plurality of function setting keys for receiving function settings, and display the first and second function screens at the display section in accordance with an instruction inputted on a first operation key on which an instruction for displaying the first function screen at the display section is inputted and an instruction inputted on a second operation key on which an instruction for displaying the second function screen different from the first function screen at the display section is inputted, receive, in accordance with operation performed on the function setting keys, instructions corresponding to the function setting keys included on the first and second function screens displayed at the display section, and further perform operation of simultaneously displaying both the first and second function screens at the display section when the first and second operation keys have been pressed simultaneously.

DETAILED DESCRIPTION

Figure 1:
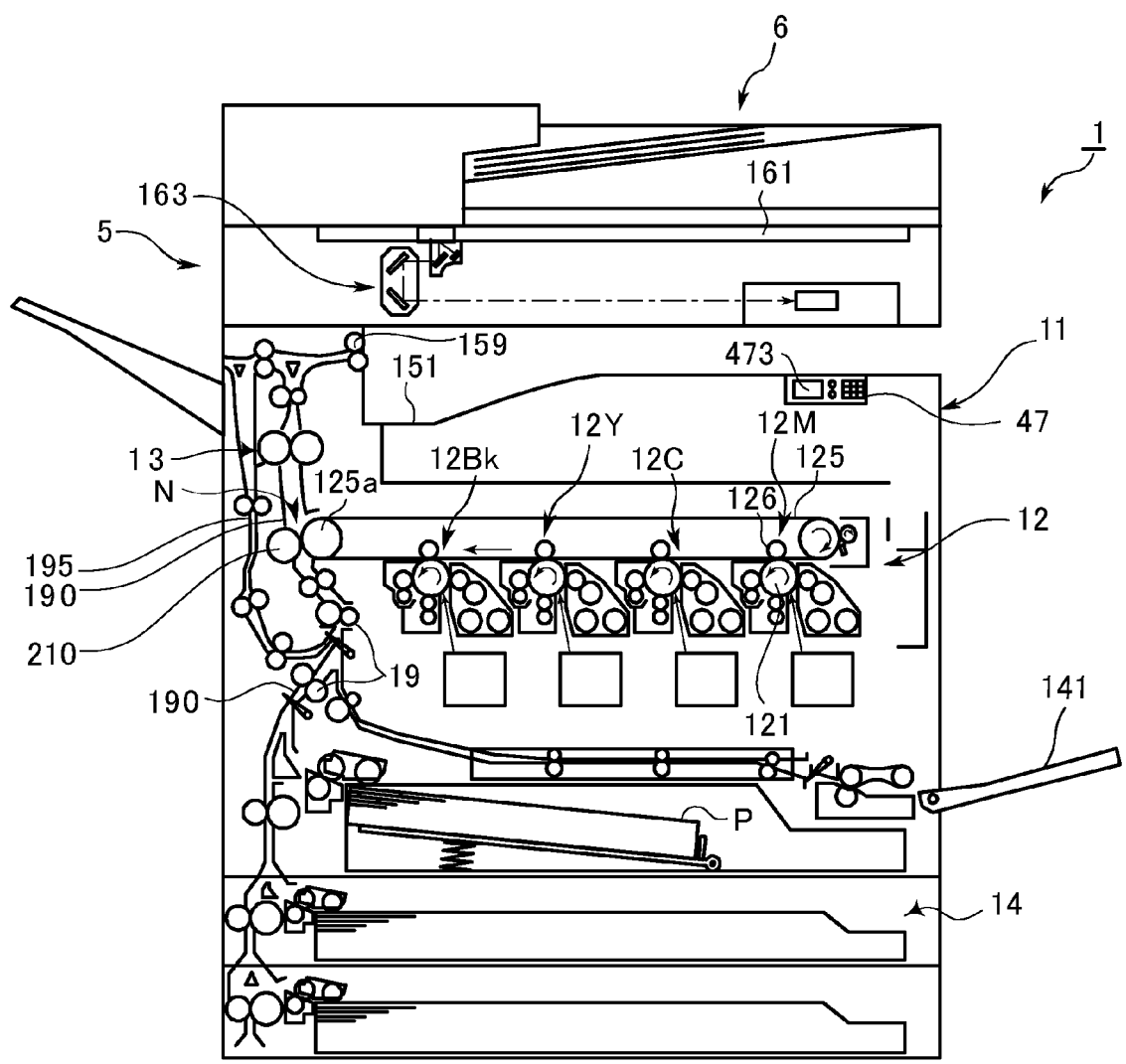
FIG. 1 is an elevational sectional view showing a structure of an image forming apparatus as an electronic device according to one embodiment of this disclosure.

Hereinafter, an image forming apparatus as an electronic device and a display control program according to one embodiment of this disclosure will be described with reference to the accompanying drawings. FIG. 1 is an elevational sectional view showing a structure of the image forming apparatus as the electronic device according to one embodiment of this disclosure.

The image forming apparatus 1 according to one embodiment of this disclosure is a multifunction peripheral combining a plurality of functions such as, for example, a copy function, a printer function, a scanner function, and a facsimile function. The image forming apparatus 1 includes: in an apparatus body 11, an operation section 47, an image formation section 12, a fixing section 13, a paper feed section 14, a document feed section 6, a document reading section 5, etc.

The operation section 47 receives, from an operator, instructions such as an image formation operation execution instruction and a document reading operation execution instruction for various kinds of processing and operation executable by the image forming apparatus 1. The operation section 47 includes a display section 473 which displays an operation guide for the operator, etc.

To perform the document reading operation by the image forming apparatus 1, an image of a document fed by the document feed section 6 or a document loaded on document loading glass 161 is optically read by the document reading section 5 to generate image data.

To perform the image formation operation by the image forming apparatus 1, based on, for example, the image data generated by the document reading operation described above, the image formation section 12 forms a toner image onto paper P as a recording medium fed from the paper feed section 14. To perform color printing, a magenta image formation unit 12M, a cyan image formation unit 12C, an yellow image formation unit 12Y, and a black image formation unit 12Bk of the image formation section 12, based on images formed of their respective color components forming the aforementioned image data, respectively form toner images on photoconductive drums 121 through charging, exposure, and developing processes, and transfer these toner images onto an intermediate transfer belt 125 by a primary transfer roller 126.

The aforementioned toner images of the respective colors transferred onto the intermediate transfer belt 125 are superposed one on another on the intermediate transfer belt 125 through transfer timing adjustment, turning into a color toner image. A secondary transfer roller 210, at a nip part N formed with a driving roller 125A with the intermediate transfer belt 125 in between, transfers this color toner image, which has been formed on a surface of the intermediate transfer belt 125, onto the paper P conveyed from the paper feed section 14 through a conveyance path 190. Then the fixing section 13 fixes, onto the paper P, the toner image on the paper P through thermal compression. The paper P on which the color image already subjected to fixing processing has been formed is discharged to a discharge tray 151.

Figure 2:
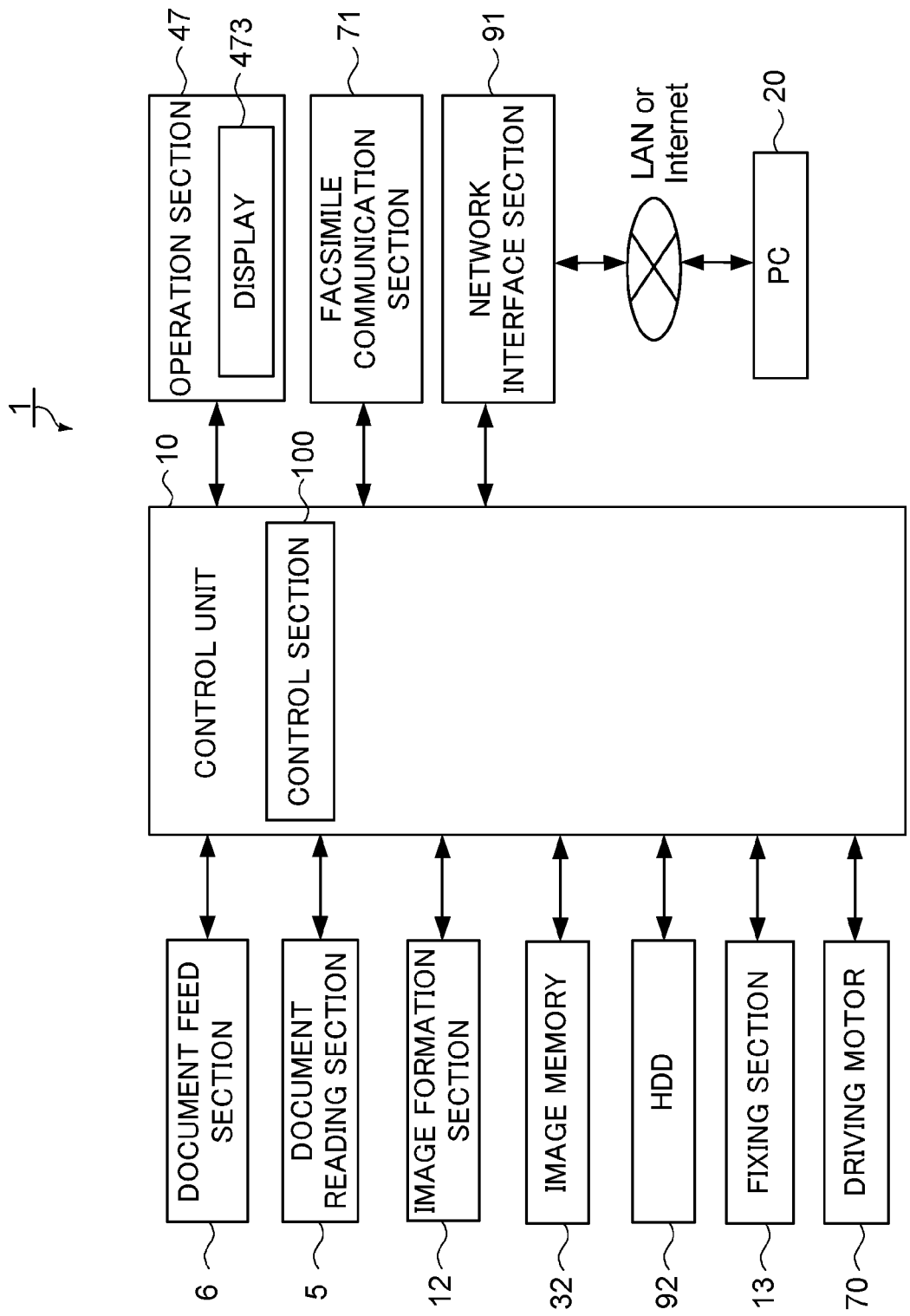
FIG. 2 is a functional block diagram showing major inner configuration of the image forming apparatus.

FIG. 2 is a functional block diagram showing main inner configuration of the image forming apparatus 1. The image forming apparatus 1 includes: a control unit 10, the operation section 47, the document feed section 6, the document reading section 5, an image memory 32, the image formation section 12, the fixing section 13, a driving motor 70, a facsimile communication section 71, a network interface section 91, an HDD 92, etc.

The document reading section 5 includes a reading mechanism 163 (FIG. 1) having a light irradiation section, a CCD sensor, etc. under control by the control unit 10. The driving motor 70 is a driving source which gives a rotational driving force to each rotary member of the image formation section 12, a conveyance roller pair 19 (FIG. 1), etc.

The control unit 10 is composed of: a central processing unit (CPU), a RAM, a ROM, a dedicated hardware circuit, etc., and in charge of overall operation control of the image forming apparatus 1. The control unit 10 includes a control section 100.

The control section 100 is connected to the operation section 47, the document feed section 6, the document reading section 5, the image memory 32, the image formation section 12, the fixing section 13, the driving motor 70, the facsimile communication section 71, the network interface section 91, the HDD 92, etc., and controls these parts.

The display section 473 (FIG. 1) at the operation section 47 has a touch panel function, and the operator can touch any of keys displayed on a screen to operate the image forming apparatus 1. The control section 100 controls display of various screens at the display section 473, and also receives, based on the touch function described above, various instructions corresponding to operation performed by the operator on the keys displayed at the display section 473.

The control unit 10 functions as the control section 100 through operation in accordance with a display control program installed in the HDD 92. Note that, however, the control section 100 can also be formed of a hard circuit without depending on the operation in accordance with the display control program by the control unit 10.

Figure 3:
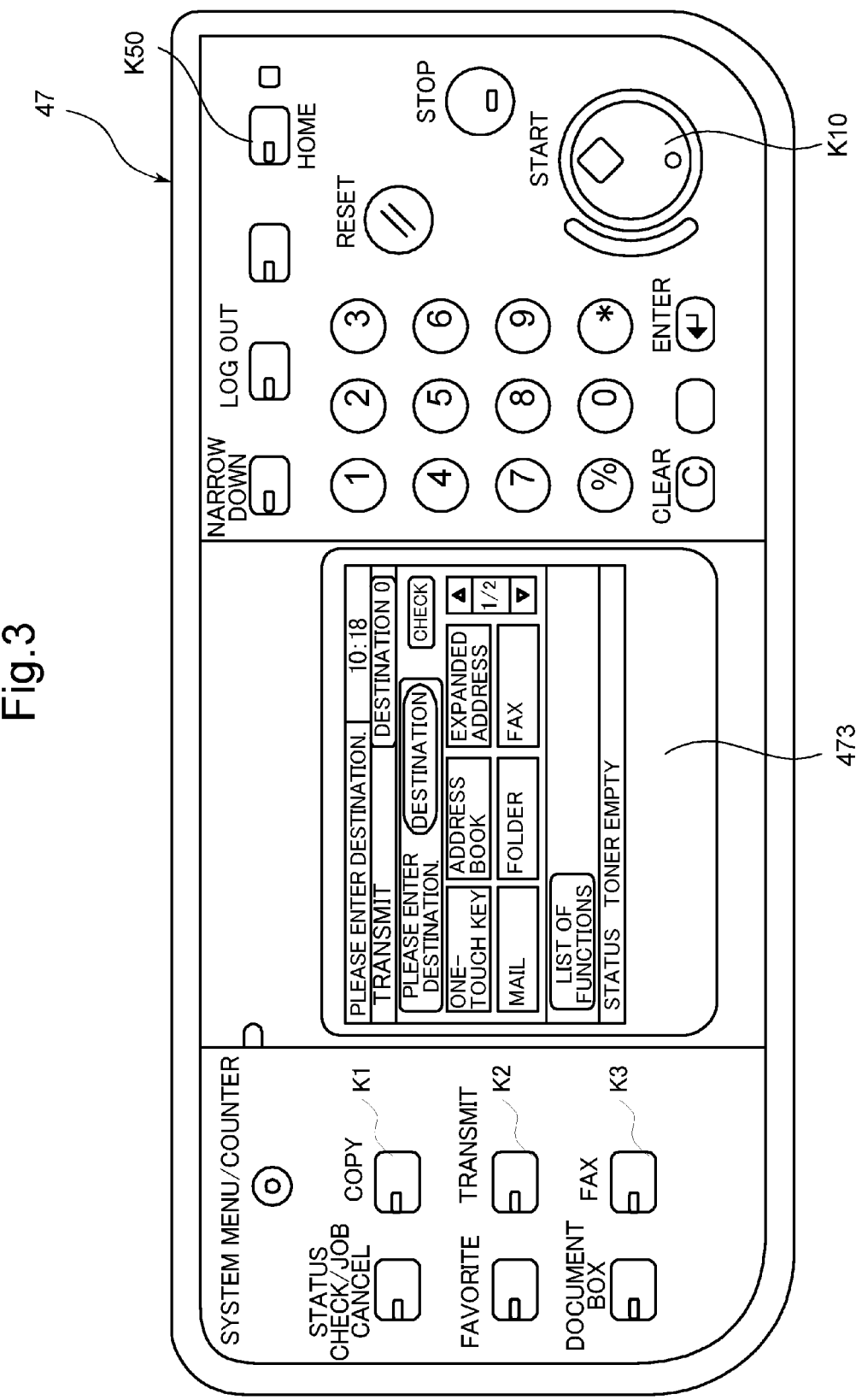
FIG. 3 is a diagram showing one example of various operation keys (hard keys) arranged at an operation section.

FIG. 3 is a diagram showing one example of various operation keys (hard keys) arranged at the operation section 47. Arranged at the operation section 47 are the various operation keys (hard keys) for retrieving function screens for making settings of the various functions such as the copy function, the printer function, the scanner function, and the facsimile function included in the image forming apparatus 1. The copy key K1 is a key for retrieving the copy screen for making the various settings of the copy function. The transmit key K2 is a key for retrieving the transmission screen for making the various settings of the scanner function. The fax key K3 is a key for retrieving the fax screen for making the various settings of the fax function.

Figure 4:
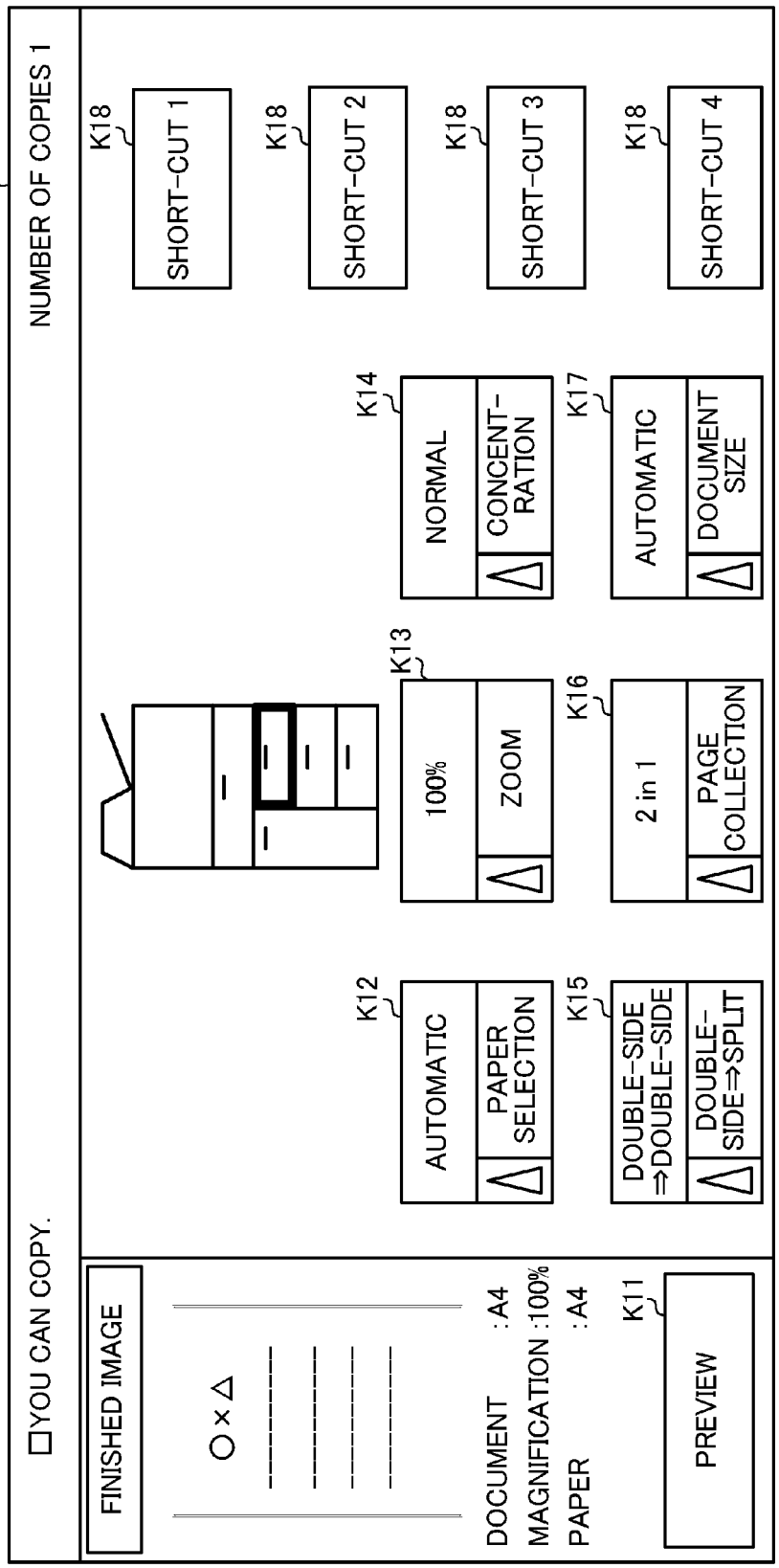
FIG. 4 is a diagram showing a copy screen (one example of a first function screen) displayed at a display section.

For example, upon pressing of the copy key K1 by the operator, the control section 100 receives the instruction for displaying the copy screen at the display section 473. The control section 100 retrieves the copy screen and displays it at the display section 473. FIG. 4 is a diagram showing one example of the copy screen 102 displayed at the display section 473. The copy screen 102 is one example of a first function screen in a scope of the claims.

The copy screen 102 includes a plurality of function setting keys K11 to K18 for receiving the settings of the copy function. The preview key K11 is a key for inputting the instruction for displaying a finished image at the display section 473. The paper selection key K12 is a key for inputting the instruction for setting a paper feed cassette. The zoom key K13 is a key for inputting the instruction for setting magnification of a document. The concentration key K14 is a key for inputting the instruction for setting copy concentration. The double-side/split key K15 is a key for inputting the instruction for setting printing on both sides of paper or one-side printing on an individual page of a double-sided document. The page collection key K16 is a key for inputting the instruction for setting for collective printing of a plurality of documents on one page. The document size key K17 is a key for inputting the instruction for setting a document reading size.

The short-cut key K18 is a key for inputting the instruction for settings for easily retrieving the frequently used function. A plural number of the short-cut key K18 is prepared, and for example, in a case where the function: layout "Left→Right" with Page collection [2 in 1] is frequently used, said function is made to correspond to arbitrary one of the short cut keys 18. Upon pressing of these keys by the operator, the control section 100 receives the instructions respectively corresponding to these keys.

Figure 5:
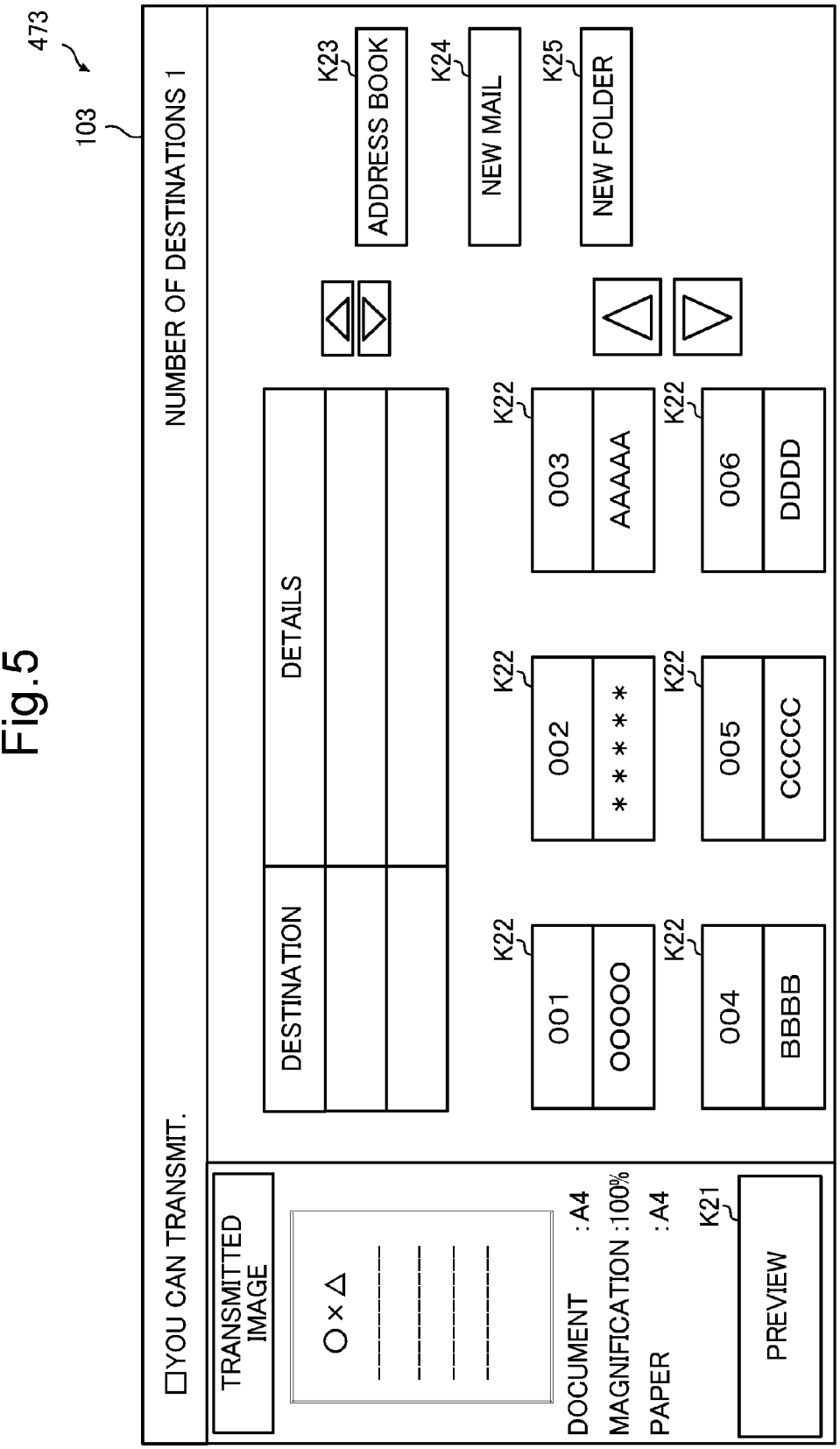
FIG. 5 is a diagram showing a transmission screen (one example of a second function screen) displayed at the display section.

Moreover, for example, upon pressing of the transmit key K2 (FIG. 3) by the operator, the control section 100 receives the instruction for retrieving the transmission screen and displaying it at the display section 473. FIG. 5 is a diagram showing the transmission screen 103 displayed at the display section 473. The transmission screen is one example of a second function screen in the scope of the claims.

The transmission screen 103 includes: a plurality of function setting keys K21 to K25 for receiving the settings of the scanner function. Upon pressing of these keys by the operator, the control section 100 receives the instructions respectively corresponding to these keys. The preview key K21 is a key for inputting the instruction for displaying a transmitted image at the display section 473. The one-touch keys K22 is a key for making one-touch selection of a destination. A plural number of the one-touch key K22 is prepared, and each of them is a key for the operator to input the instruction for registering, to arbitrary one of the one-touch keys K22, the destination of a document image obtained through reading by the document reading section 5. The destinations include, in addition to a destination of Fax transmission, for example, a common folder of a server device, not shown.

The address book key K23 is a key for inputting the instruction for retrieving an address book. Upon pressing of the address book key K23, the control section 100 displays a list of destinations above the one-touch keys K22 at the display section 473, and the operator can select, from the list of destinations, the arbitrary destination not registered to the one-touch keys K22.

The new mail key K24 is a key for inputting the instruction for transmitting a mail to a destination not registered in the address book. Upon pressing of the new mail key K24, the control section 100 displays a mail address input screen (not shown) at the display section 473, and the operator can directly input an arbitrary mail address.

The new folder key K25 is a key for inputting the instruction for specifying a common folder not registered in the address book. Upon pressing of the new folder key K25, the control section 100 displays, at the display section 473, an input screen (not shown) for a host name, pass, a login user name, and a login password, and the operator can create a new common folder in the server device, not shown.

Figure 6:
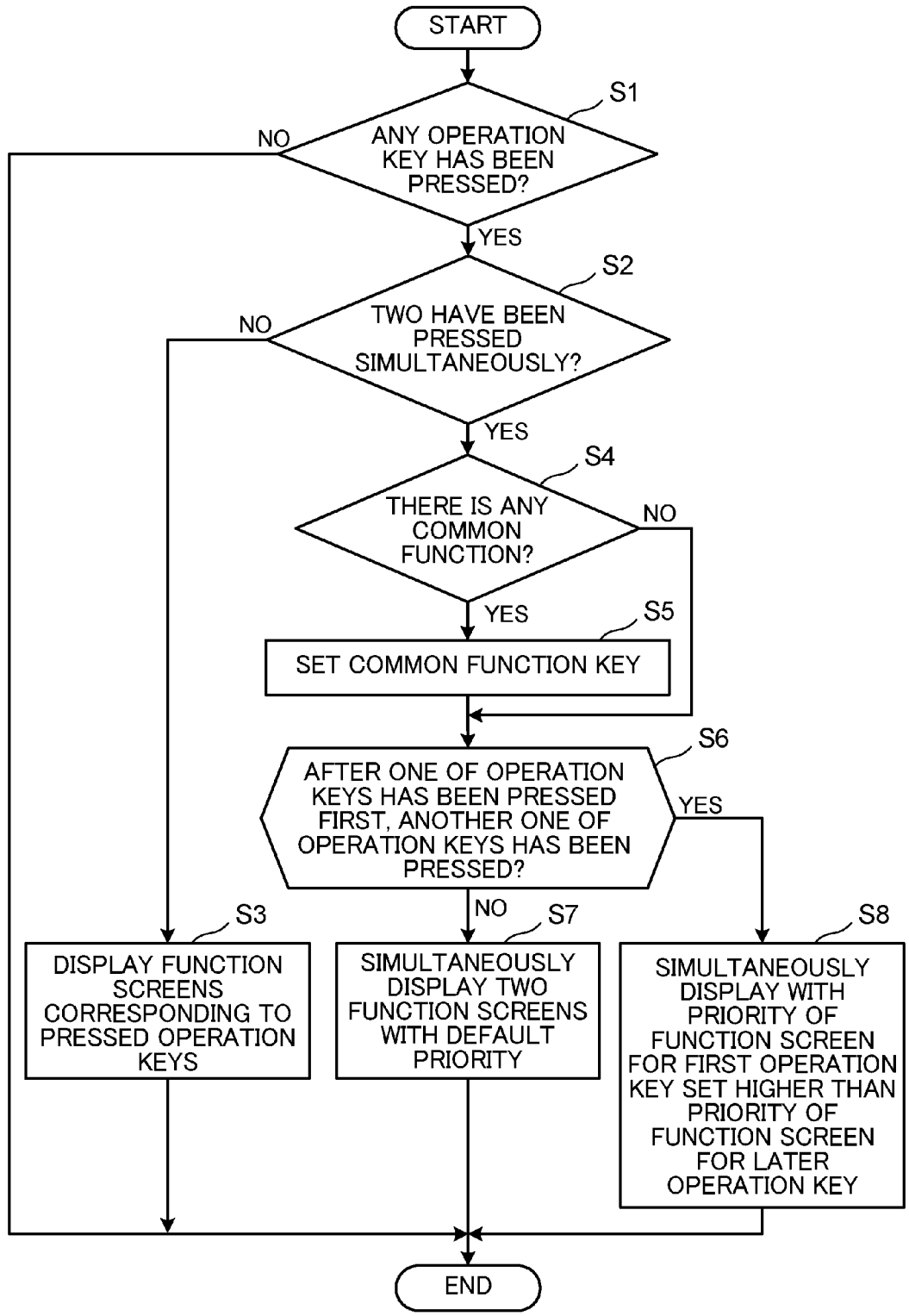
FIG. 6 is a flowchart showing one example of processing of displaying the function screens at the display section.

Next, the display control of the function screens by the control section 100 will be described. FIG. 6 is a flowchart showing one example of processing of displaying the function screens at the display section 473.

Upon detection that the operation key such as the copy key K1 and/or the transmit key K2 arranged at the operation section 47 has/have been pressed (YES in S1), the control section 100 judges whether the single operation key has been pressed or the two operation keys have been pressed simultaneously (whether there is any time zone in which both of the two operation keys have been pressed. The same applies below.) (S2).

Upon judgement that the two operation keys have not been pressed simultaneously and the single operation key has been pressed (NO in S2), the control section 100 displays, at the display section 473, the function screen corresponding to the pressed operation key (S3). For example, the control section 100 displays the copy screen 102 shown in FIG. 4 when the copy key K1 has been pressed, and displays the transmission screen 103 shown in FIG. 5 when the transmit key K2 has been pressed.

On the other hand, upon judgement that the two operation keys have been pressed simultaneously (YES in S2), the control section 100 judges whether or not there is any function setting key (common function key) common to the two function screens corresponding to the pressed two operation keys (S4). For example, document zooming, printing concentration, and a document reading size are function settings common to both the copy function and the transmission function, and the zoom key K13, the concentration key K14, and the document size key K17 on the copy screen 102 correspond to the common function keys. Upon judgment by the control section 100 that there is any common function key for the two function screens corresponding to the two pressed operation keys (YES in S4), the control section 100 makes settings in a manner such as to display these common function keys on the display screen distinctively from the other function setting keys (S5). Upon judgment by the control section 100 that there is no common function key for the two function screens corresponding to the two pressed operation keys (NO in S4), the processing of S5 is skipped.

Furthermore, if the two operation keys have been pressed simultaneously, the control section 100 judges whether or not these two operation keys have been pressed with time difference (for example, 0.5 seconds or more), that is, whether or not one of the operation keys has been pressed first and another one of the operation keys has been pressed later on (S6). If the two operation keys have been pressed simultaneously but these two operation keys have not been pressed with the aforementioned time difference (NO in S6), the control section 100 simultaneously displays, at the display section 473, the two function screens corresponding to these two pressed operation keys with default priority (S7). For example, the control section 100 displays, at the display section 473, the respective function screens corresponding to the both operation keys with equal display areas.

On the other hand, if the two operation keys have been pressed simultaneously with the time difference (YES in S6), the control section 100 simultaneously displays, at the display section 473, both of these two function screens in a manner such that the function screen corresponding to the operation key which has been pressed first has higher priority than the function screen corresponding to the operation key which has been pressed later on (S8).

Figure 7:
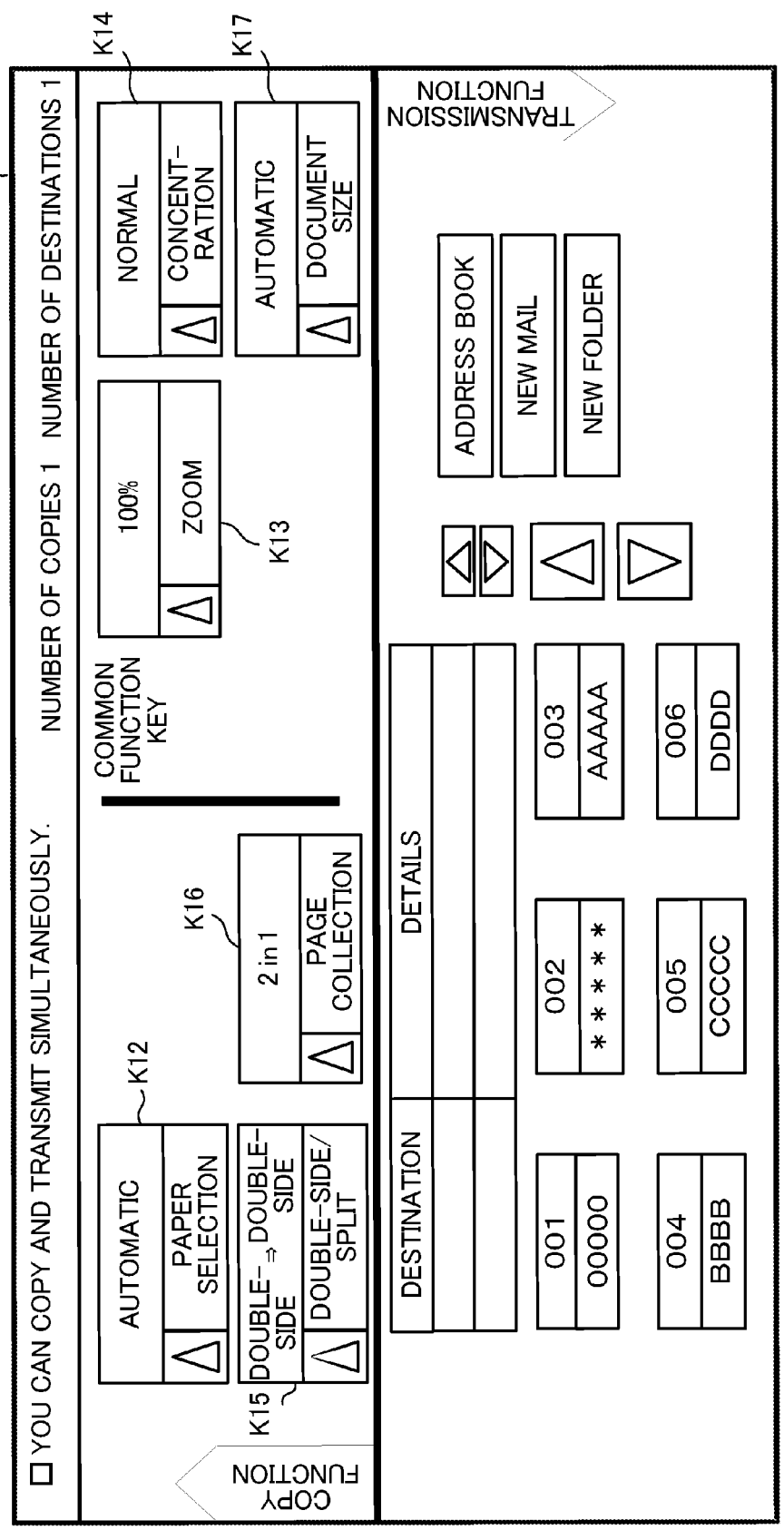
FIG. 7 is a diagram showing one example of simultaneous display of the copy screen and the transmission screen (split display)

FIG. 7 is a diagram showing one example of the simultaneous display of the copy screen and the transmission screen in a case where the copy key K1 and the transmit key K2 have been pressed simultaneously (split display). As shown in FIG. 7, the control section 100 displays a copy and transmission screen 104 at the display section 473. At this point, the control section vertically splits a display region of the display section 473 with the copy function screen arranged at a top and the transmission function screen arranged at a bottom to display the copy and transmission screen 104 at the display section 473.

For example, in a case where the control section 100 stores a rule such that the function screen with a higher priority is displayed at a top, if the copy key K1 has been pressed first and then the transmit key K2 has been pressed while the copy key K1 is continuously pressed (YES in S6), the control section 100, as shown in FIG. 7, displays the copy function screen at the top and the transmission function screen at the bottom (S8). If the copy key K1 and the transmit key K2 have been pressed in order opposite to the one described above, the control section 100 applies arrangement opposite to that of FIG. 7, that is, displays the transmission function screen at the top and the copy function screen at the bottom.

Alternatively, in a case where the control section 100 stores a rule such that the copy function screen has higher priority than the transmission function screen in a default, regardless of which of the copy key K1 and the transmit key K2 has been pressed first or later on, the control section 100, as shown in FIG. 7, may display the copy function screen at the top and the transmission function screen at the bottom. In a case where the control section 100 has a rule such that the transmission function screen has higher priority than the copy function screen in a default, regardless of which of the copy key K1 and the transmit key K2 has been pressed first or later on, the control section 100 may apply arrangement opposite to that of FIG. 7, that is, may display the transmission function screen at the top and the copy function screen at the bottom.

Since the document zooming, printing concentration, and the document reading size are the function settings common to both the copy function and the transmission function, the control section 100 discriminates the zoom key K13, the concentration key K14, and the document size key K17 as the function keys common to the copy function and the transmission function from the other function setting keys, and displays them in a display region separate from these other function setting keys.

A display region of each function screen on the copy and transmission screen 104 is narrow due to the split display, and thus a number of function setting keys included in the original copy screen 102 (FIG. 4) and transmission screen 103 (FIG. 5) may be reduced to display the copy and transmission screen 104. For example, illustrated in FIG. 7 is the example where the preview key K11 and the short-cut keys k18 on the original copy screen 102 and the preview key K21 on the original transmission screen 103 are omitted.

Described above is the processing performed in the case where, while one of the operation keys is pressed, another one of the operation keys has been pressed later on, but when the two operation keys described above have been pressed simultaneously and in this state, one of the operation keys has been separated while another one of the operation keys is continuously pressed, it is also possible for the control section 100 to make the display region of the function screen corresponding to the one operation key wider than the display region of the function screen corresponding to the separated another operation key for screen splitting of these two function screens to display them at the display section 473.

Figure 8:
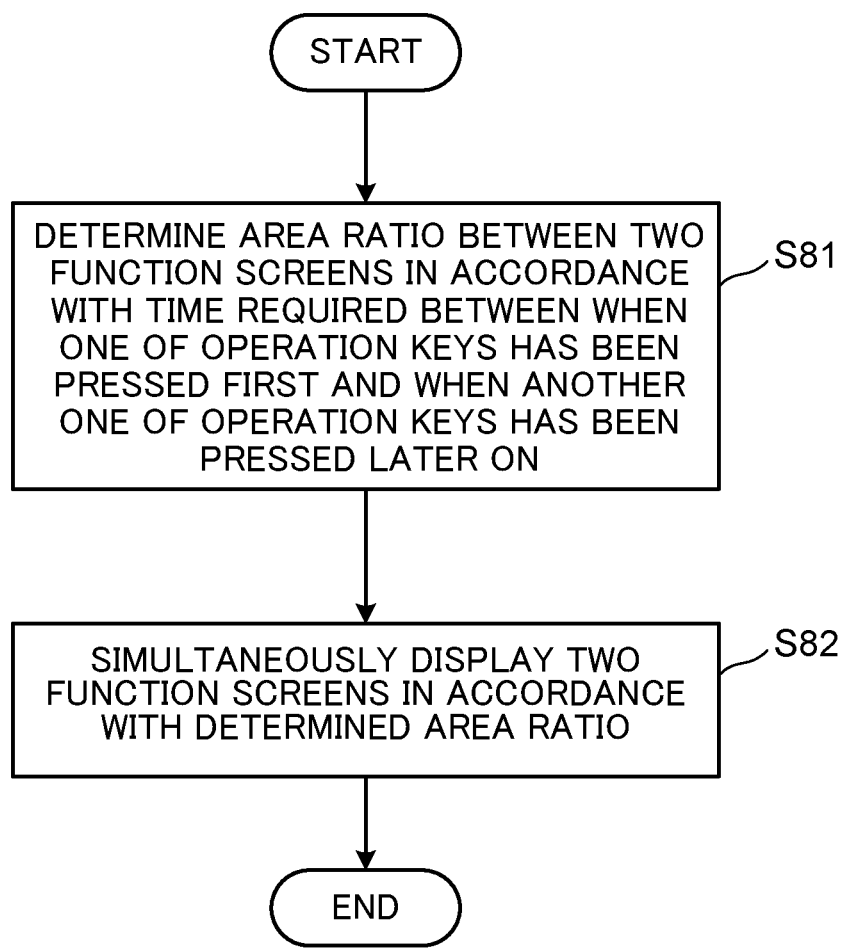
FIG. 8 is a flowchart showing processing of varying an area ratio between the two function screens for the split display.

Further, in a case where, while one of the operation keys is pressed, another one of the operation keys has been pressed later on, the control section 100, in accordance with time required for pressing the another operation key after the one operation key has been pressed, may vary an area ratio between the two function screens to be displayed simultaneously. A method of varying such an area ratio will be described. FIG. 8 is a flowchart showing processing of varying the area ratio between the two function screens for split display. The processing shown in this flowchart is one example of detailed processing of step S8 in FIG. 6.

Figure 9:
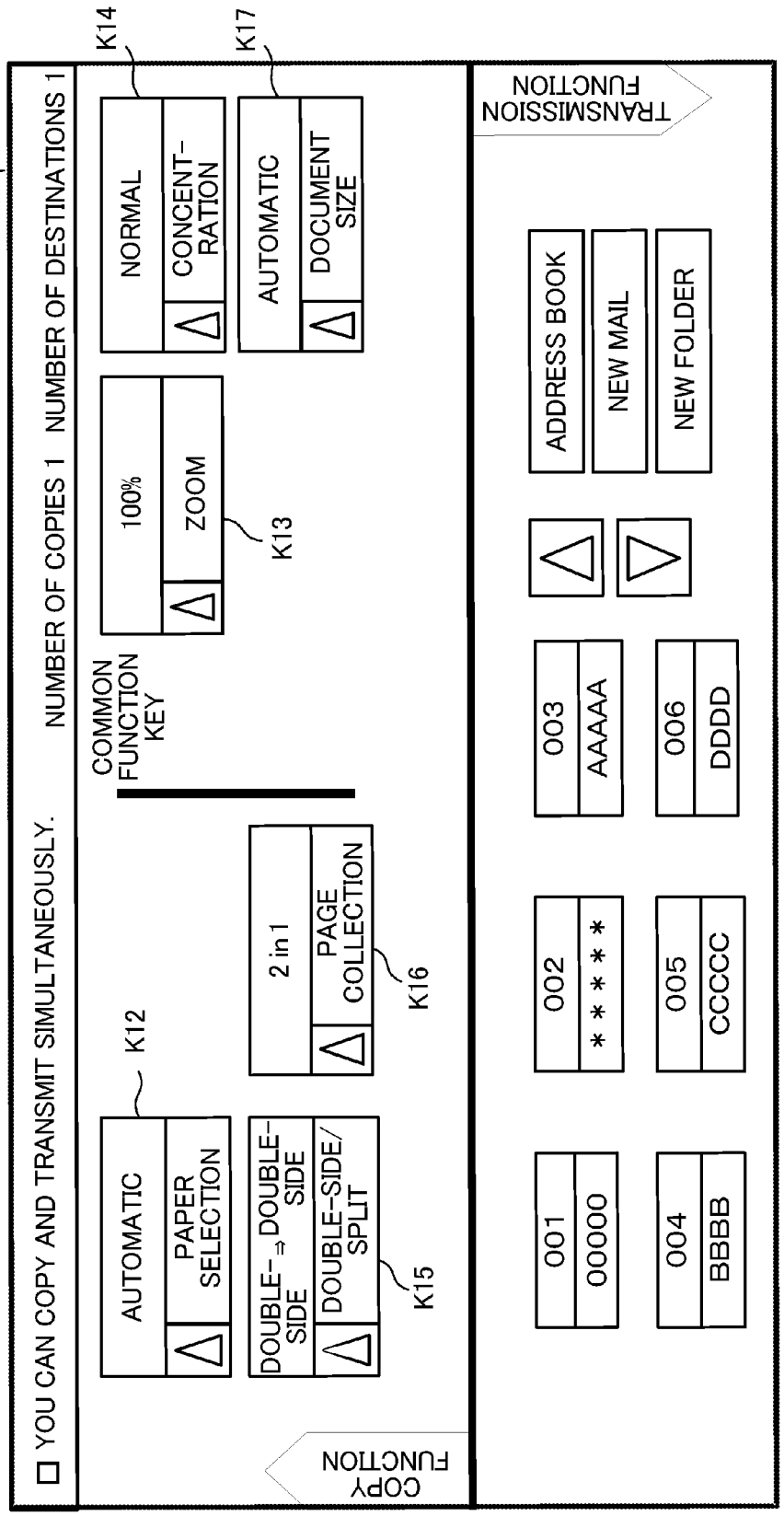
FIG. 9 is a diagram showing another example of the simultaneous display of the copy screen and the transmission screen (split display with a varied area ratio)

If the two operation keys have been pressed simultaneously with the time difference (YES in S6), the control section 100 determines the area ratio between the two function screens in accordance with the aforementioned time difference between when one of the operation keys has been pressed and when another one of the operation keys has been pressed (S81). For example, if the time difference between when one of the operation keys has been pressed and when another one of the operation keys has been pressed is two seconds or more, the control section 100 sets, at a predefined area ratio, for example, 7:3, the ratio between the display area of the function screen corresponding to this operation key and the display area of the function screen corresponding to the operation key pressed later on. Then the control section 100 simultaneously displays the two function screens at the display section 473 with the determined area ratio (S82). FIG. 9 is a diagram showing an example of this case and a diagram showing another example of simultaneous display of the copy screen and the transmission screen with a varied area ratio (split display with the varied area ratio) in a case where the copy key K1 and the transmit key K2 have been pressed simultaneously.

Note that the method of determining the area ratio described above is just one example, and a different method of determining the area ratio may be adopted. For example, the control section 100 may vary the area ratio described above in accordance with a length of the time difference described above and calculate the area ration described above as appropriate.

Note that on the copy and transmission screen 104 shown in FIGS. 7 and 9, the area ratio between the two function screens may be varied through operation by the operator later on. For example, upon touch of the display region of either of the two function screens by the operator's finger and sliding movement of this finger towards another one of the function screens on the screen, a travel distance achieved by this sliding movement is inputted to the control section 100 by the touch panel function, and the control section 100 varies the area ratio between the two function screens in accordance with this travel distance. For example, the control section 100 varies the area ratio between the two function screens in a manner such as to increase the display region of the aforementioned function screen touched and reduce the display region of the other function screen by an amount in accordance with the aforementioned travel distance.

Figure 10:
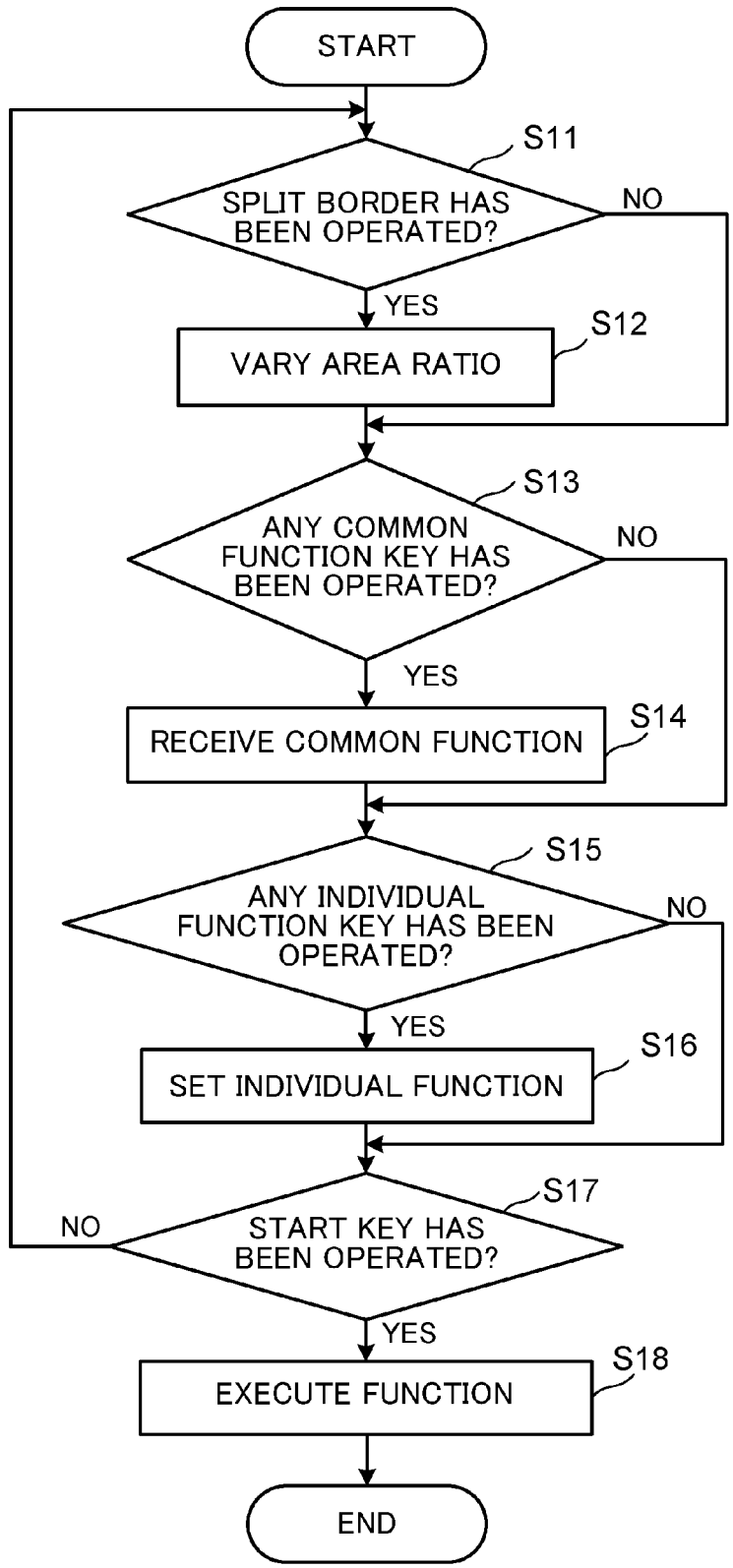
FIG. 10 is a flowchart showing processing of operation performed on the two function screens simultaneously displayed.

As a result, the operator can operate the two function screens simultaneously displayed at the display section 473 to input the settings for the two functions on one display screen. FIG. 10 is a flowchart showing processing of operation performed on the two function screens which have been simultaneously displayed.

If the operator has touched one of the two function screens by his or her finger and makes sliding movement of this finger towards another one of the function screens (YES in S11), the control section 100 varies the area ratio between the two function screens as described above (S12). For example, upon touch of the copy function screen on the copy and transmission screen 104 shown in FIG. 7 by his or her finger and making sliding movement of this finger towards the transmission function screen after this touch, the control section 100 widens the copy function screen to display it at the display section 473 as shown in FIG. 9.

Here, if the operator has touched the common function keys (the zoom key K13, the concentration key K14, and the document size key K17 in the example of FIG. 7) to make the settings (YES in S13), the control section 100 receives setting items provided by various instructions inputted through operation of these operated common function keys, as the settings for the both functions shown by the two function screens displayed at the display section 473 (S14). For example, if the magnification key K13 has been operated on the copy and transmission screen 104 of FIG. 7 to set zoom "80%", the control section 100 receives the zoom 80% as the settings for both the copy and transmission functions.

If the operator has touched the individual function keys (the paper selection key K12, the double-side/one-side key K15, and the page collection key K16 in the example of FIG. 7) to make the settings (YES in S15), the control section 100 receives setting items shown by instructions inputted through these operated individual function keys as the settings for the function corresponding to the function screen displaying these keys (S16). For example, if the double-side/one-side key K15 has been operated on the copy and transmission screen 104 of FIG. 7 to set "One-side→Double side", the control section 100 receives this setting "One-side→Double side" as the settings for the copy function.

Until reception of an instruction for executing the both functions shown by the aforementioned both function screens as a result of pressing the start key K10 (FIG. 3) at the operation section 47 by the operator (NO in S17), the control section 100 repeats the processing of S11 to S16 and receives input of the settings for these both functions.

Then if the control section 100 has received the instruction for execution with the aforementioned set contents as a result of pressing the start key K10 at the operation section 47 by the operator (YES in S17), the control section 100 executes these both functions in accordance with the contents set for the both functions shown by the aforementioned two function screens (S18). At this point, the control section 100 applies the settings, which have been received for the both functions shown by the aforementioned two function screens in the processing of S11 to S16 described above, to jobs of the respective functions, but applies the settings received based on operation of the aforementioned common function keys to both jobs of these both functions.

Figure 11:
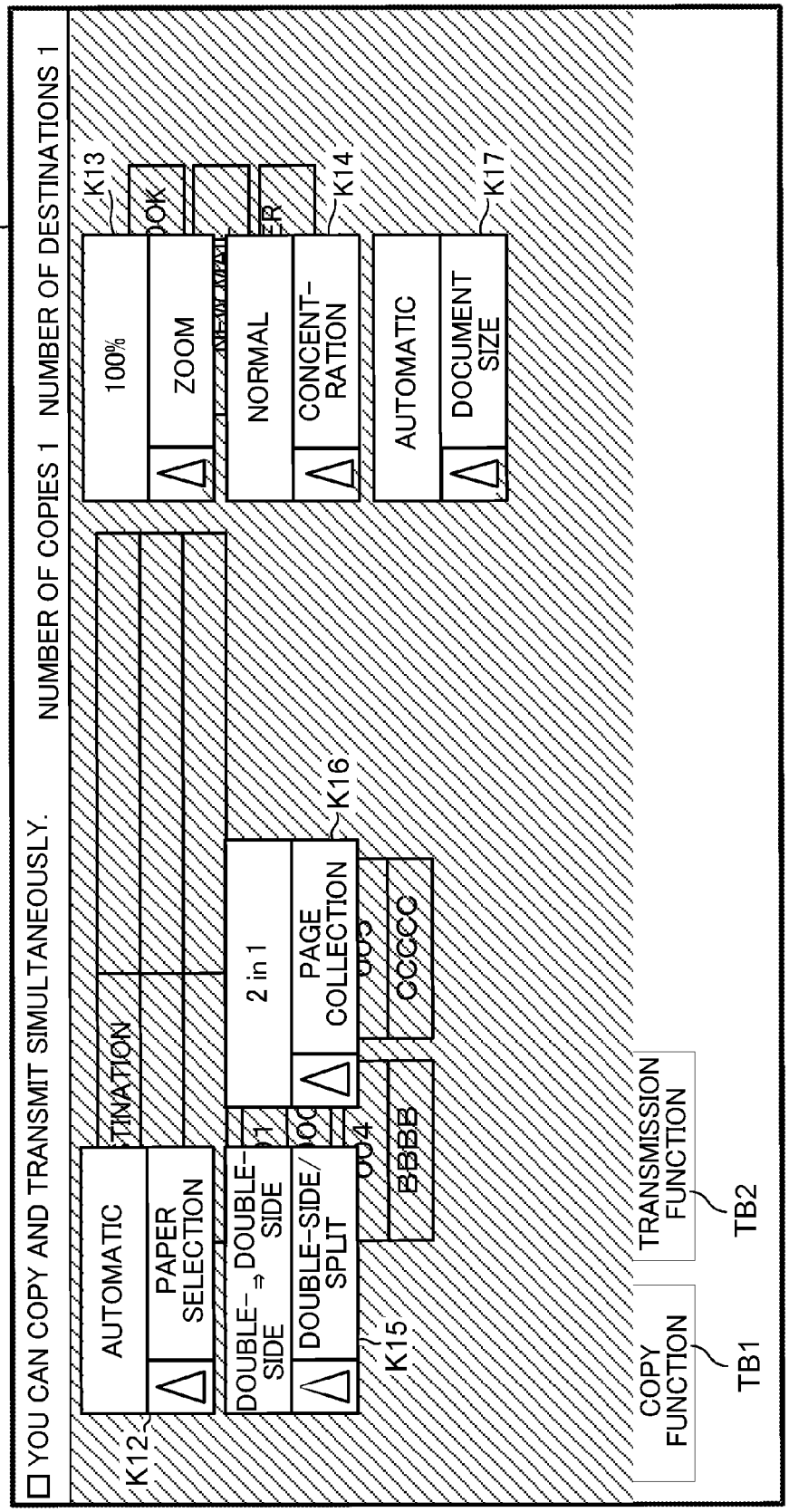
FIG. 11 is a diagram showing still another example of the simultaneous display of the copy and transmission screens (superposed display)

Moreover, the simultaneous display of the two function screens described above may be provided not only through the vertical splitting of the display section 473 as shown in FIGS. 7 and 9 but also through display such that the two function screens appears for the operator viewing the display section 473 to be superposed on each other on a near side and a far side, respectively. FIG. 11 is a diagram showing still another example of the simultaneous display of the copy screen and the transmission screen (superposed display). For example, the display section 473, as shown in FIG. 11, displays a copy and transmission screen 105 in a manner such that a region other than the function setting keys on the copy function screen is viewed semi-transparently in an artificial manner by the operator, and displays the transmission function screen in this region, thereby displaying both the copy function screen and the transmission function screen at the display section 473. The control section 100 achieves the display, for example, by displaying the various keys on the copy function screen in a normal state and displaying the transmission function screen in gray-out.

For example, in a case where the copy key K1 has been pressed first and then the transmit key K2 has been pressed while the copy key K1 is continuously pressed, the control section 100, as shown in FIG. 11, provides normal display of a guide image and the various keys related to the copy function screen and provides gray-out display related to the transmission function screen in the display regions other than the display region of the guide image and the various keys related to the copy function screen, thereby achieving display for the operator such that the copy function screen appears on a foreground and the transmission function screen appears therebehind (on a rear surface). In a case where the copy key K1 and the transmit key K2 have been pressed in order opposite to that described above, the control section 100 applies arrangement opposite to that of FIG. 11, that is, provides display such that the transmission function screen appears on the foreground and the copy function screen appears on the rear surface.

Alternatively, in a case where the control section 100 stores a rule such that the copy function screen has higher priority than the transmission function screen in a default, upon pressing of the copy key K1 and the transmit key K2 at almost simultaneous timing, the control section 100, as shown in FIG. 11, provides display such that the copy function screen appears on the foreground and the transmission function screen appears on the rear surface.

The control section 100 has tab images TB1 and TB2 provided for each function screen on the copy and transmission screen 105, and performs processing of, upon operation of the tab images TB1 and TB2 on the function screen desired for operation by the operator, receiving them and displaying, on the aforementioned foreground surface, the function screen corresponding to these operated tab images. As a result, the operator can, through simple operation, make switching between a front and a back of the display of the two function screens displayed at the display section 473.

Figure 12:
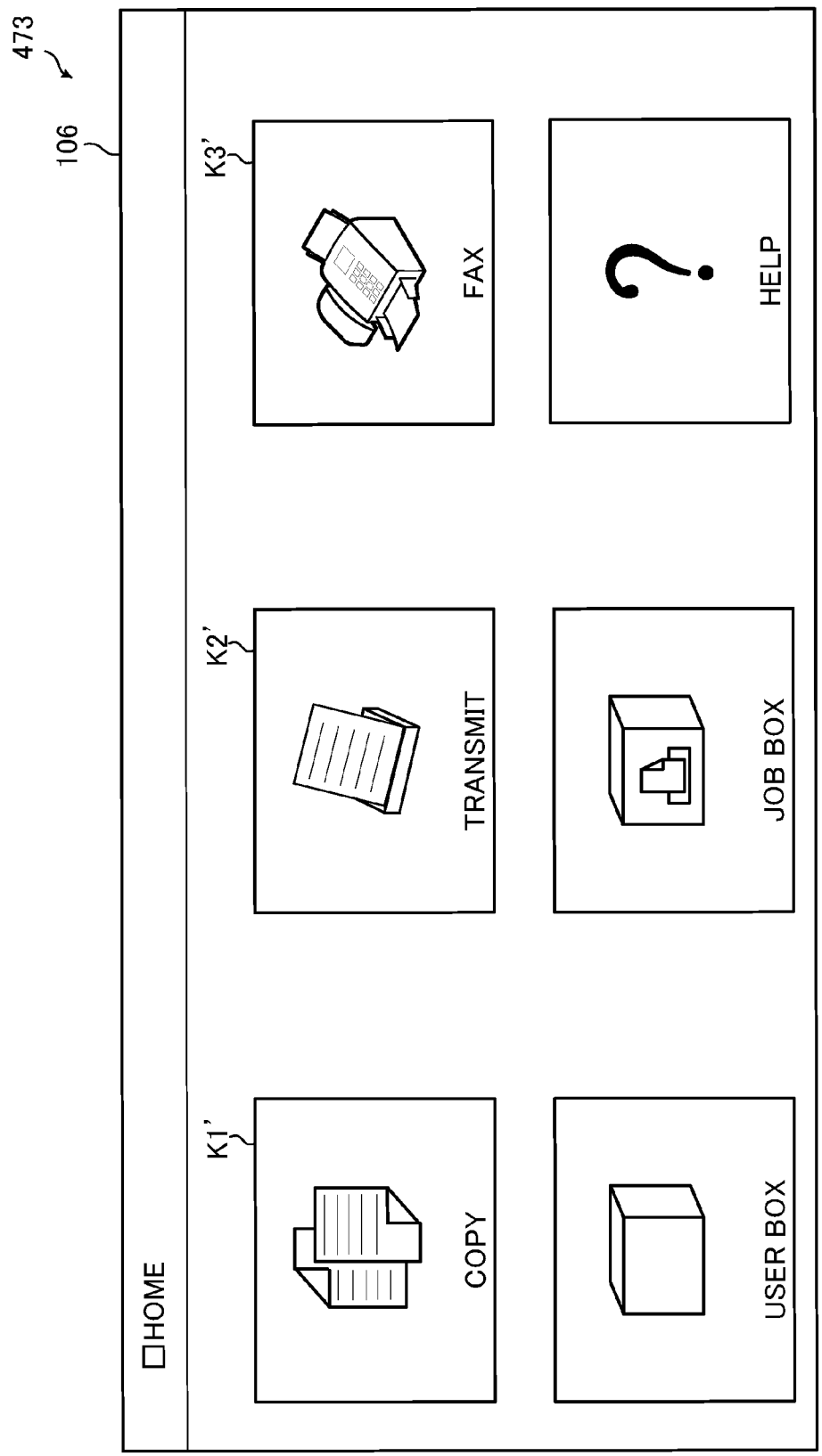
FIG. 12 is a diagram showing one example of various operation keys (soft keys) displayed at the display section

In the description above, the operation keys are hard keys, but the operation keys may be soft keys displayed at the display section 473. FIG. 12 is a diagram showing one example of the various operation keys (soft keys) displayed at the display section 473.

Upon pressing of the home key K50 (FIG. 3) at the display section 473, the control section 100 receives the instruction for displaying a home screen at the display section 473, and displays the home screen 106 as shown in FIG. 12 at the display section 473. For example, included as the various operation keys (soft keys) on the home screen 106 are: a copy key K1', a transmit key K2', a fax key K3', etc.

For example, upon pressing of the copy key K1' by the operator, in accordance with an instruction inputted through this action, the control section 100, as is the case with the case where the copy key K1 arranged at the operation section 47 has been pressed, displays the copy screen 102 as shown in FIG. 4 at the display section 473. Moreover, for example, upon pressing of the transmit key K2" by the operator, as is the case with the case where the transmit key K2 arranged at the operation section 47 has been pressed, the control section 100 displays the transmission screen 103 as shown in FIG. 5 at the display section 473.

Also in a case where the soft key such as the copy key K1' or the transmit key K2' displayed at the display section 473 has been pressed, as is the case with the case where the hard key such as the copy key K1 or the transmit key K2 has been pressed, the control section 100 simultaneously displays the two function screens at the display section 473, as described above.

Figure 13:
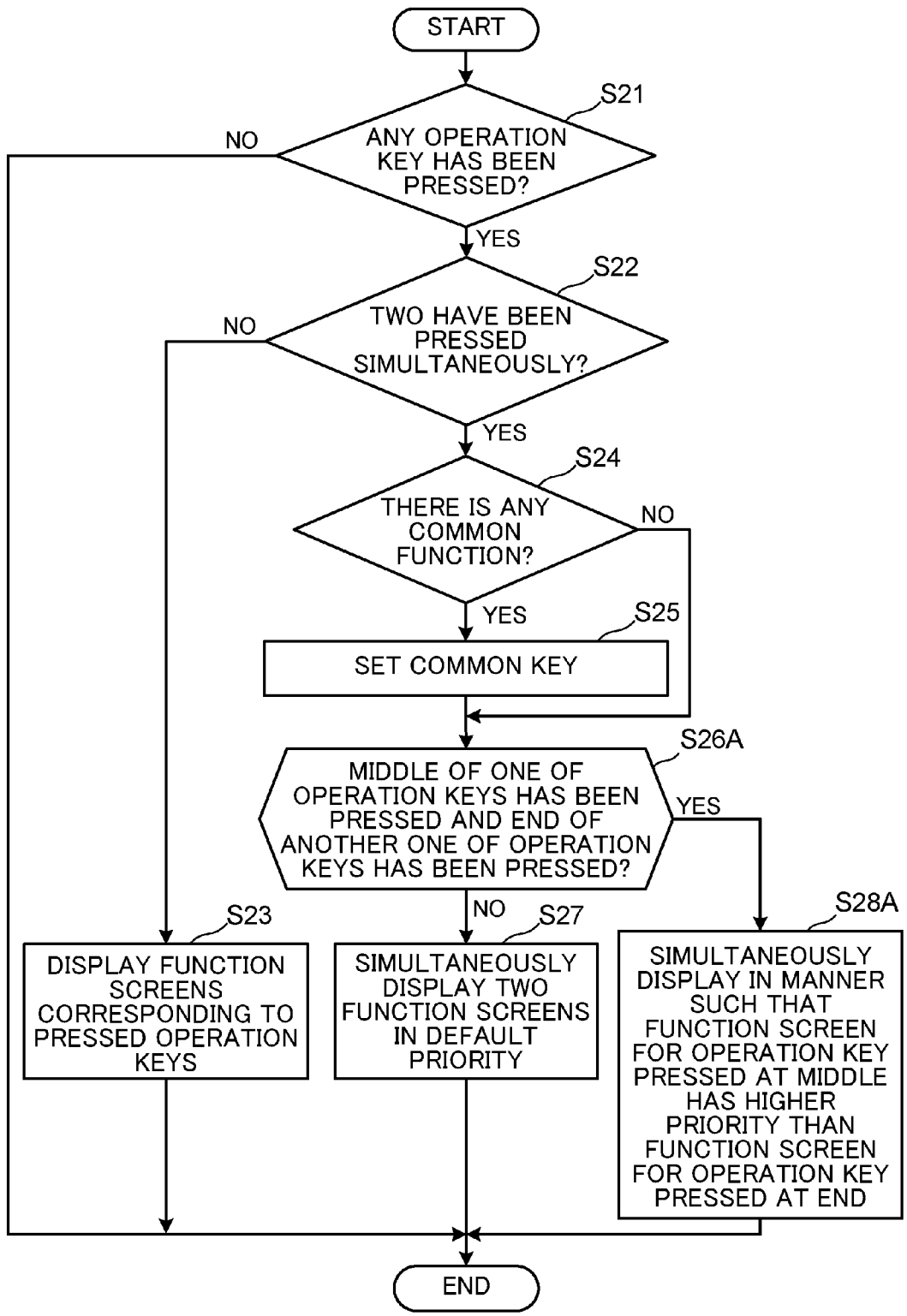
FIG. 13 is a flowchart showing one example of processing of displaying the function screens at the display section when the soft keys have been pressed.

Further, in an embodiment in which these soft keys are displayed, the simultaneous display of the two function screens can be varied in various ways in accordance with positions touched by the operator's finger. FIG. 13 is a flowchart showing one example of processing of displaying the function screens at the display section 473 in a case where the soft keys have been pressed. In this embodiment, a description of the same processing as the processing described with reference to FIG. 6 will be omitted, and a description below is focused on the processing different from the processing described with reference to FIG. 6.

After S21 to S25 have been performed in the same manner as the processing described with reference to FIG. 6, in a case where the two operation keys have been pressed simultaneously, the control section 100 determines whether or not positions of these two operation keys touched by the operator's finger are different from each other, that is, whether or not one of the operation keys has been pressed at a position close to a middle of an image indicating this operation key and another one of the operation keys has been pressed at a position close to an end part of an image indicating the another operation key (S26A). If the positions at which the two operation keys have been pressed are equal (NO in S26A), the control section 100 simultaneously displays, at the display section 473, the two function screens corresponding to these two pressed operation keys with default priority (S27). For example, the control section 100 displays, at the display section 473, the respective function screens corresponding to the both operation keys with equal display areas.

On the other hand, if the positions at which the two operation keys have been pressed differ from each other (YES in S26A), the control section 100 simultaneously displays, at the display section 473, these two function screens in a manner such that the function screen corresponding to the operation key pressed in the middle has higher priority than the function screen corresponding to the operation key pressed at the end (S28A).

Figure 14:
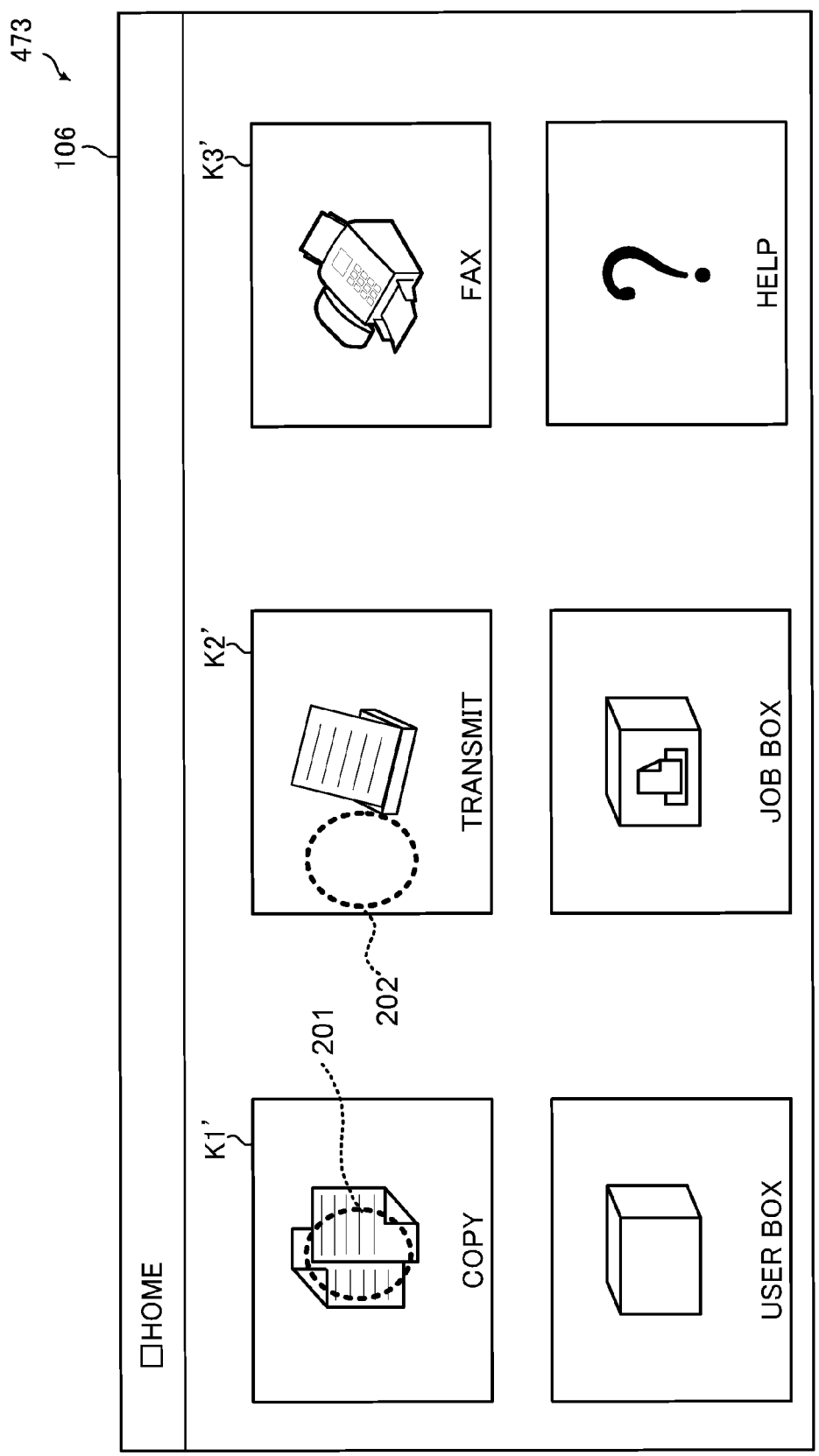
FIG. 14 is a diagram showing one example of ways of pressing the operation keys (soft keys) displayed at the display section.

FIG. 14 is a diagram showing one example of ways of pressing the operation keys (soft keys) displayed at the display section 473. As shown in FIG. 14, in a case where a section 201 touched by the operator's finger on the copy key K1' is in the middle and a section 202 touched by the operator's finger on the transmit key K2' is closer to the end than this section 201, the control section 100 simultaneously displays, at the display section 473, these two function screens with the priority of the copy function screen set higher than that of the transmission function screen. For example, the control section 100 displays, at the display section 473 the function screen corresponding to the copy key K1' with a larger display area than the function screen corresponding to the transmit key K2'.

Figure 15:
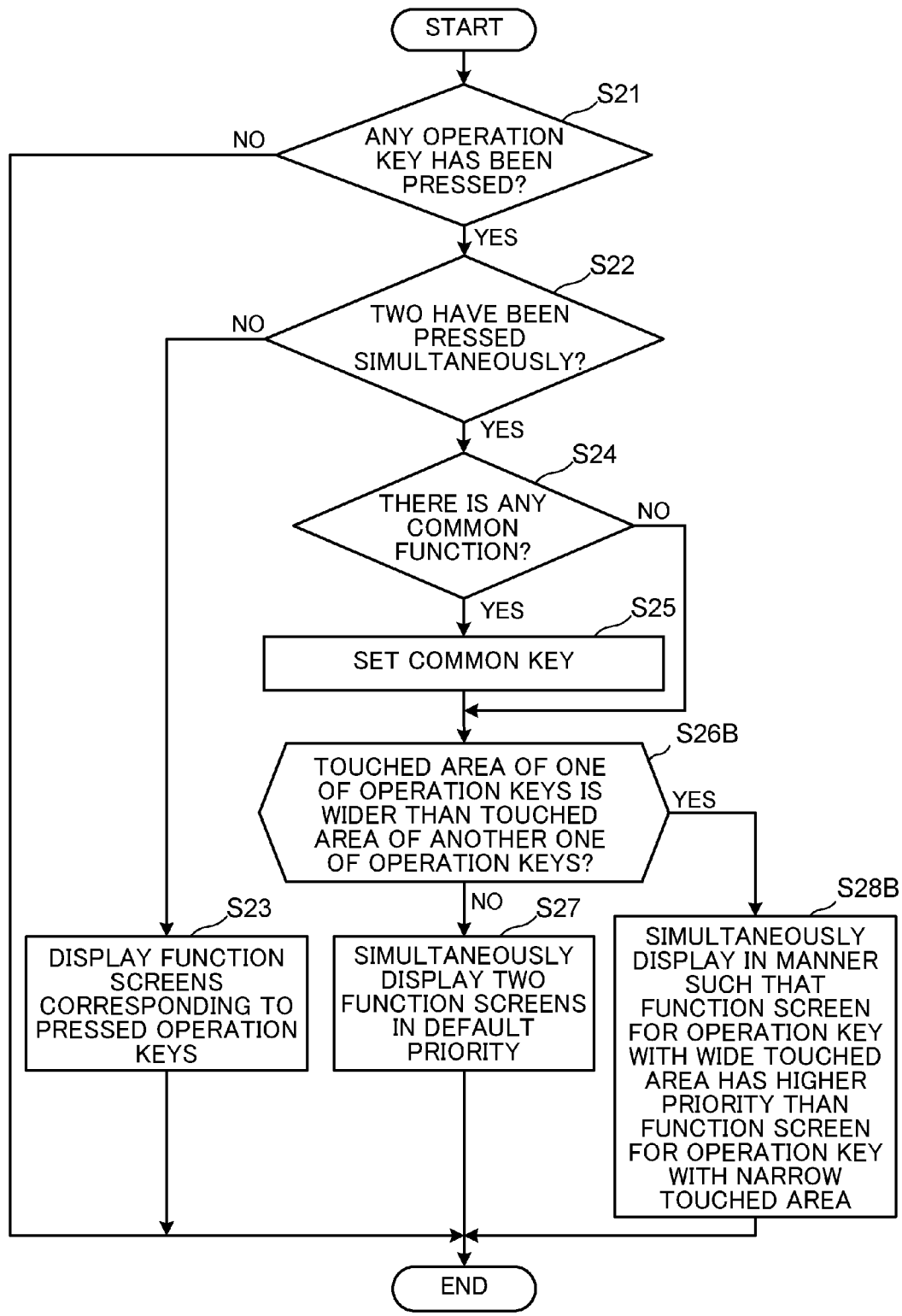
FIG. 15 is a flowchart showing another example of the processing of displaying the function screens at the display section when the soft keys have been pressed.
Figure 16:
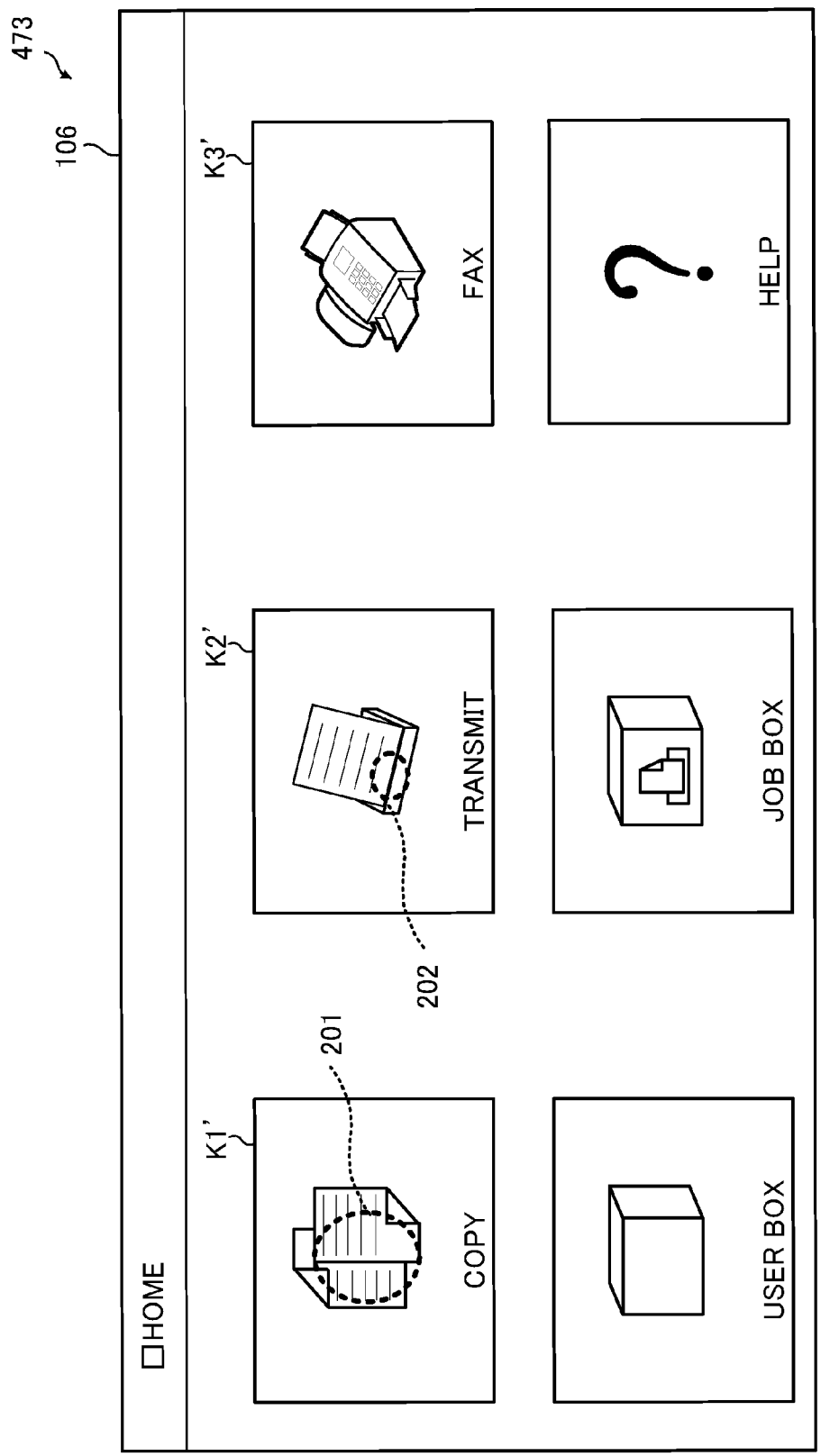
FIG. 16 is a diagram showing another example of ways of pressing the operation keys (soft keys) displayed at the display section.

Moreover, performed in case of the soft keys is processing of varying the respective display areas of the two function screens in accordance with areas touched by the operator's finger in the image display regions of the respective operation keys. FIG. 15 is a flowchart showing one example of the processing of displaying the function screens at the display section 473 in a case where the soft keys have been pressed. FIG. 16 is a diagram showing another example of the ways of pressing the operation keys (soft keys) displayed at the display section 473. In this embodiment, especially the same processing as the processing described with reference to FIG. 6 will be omitted, and a description below will focus on processing different from the processing described with reference to FIG. 6.

After S21 to S25 have been performed in the same manner as the processing described with reference to FIG. 6, in a case where the two operation keys have been pressed simultaneously, the control section 100 determines whether or not the areas touched by the operator's finger on these two operation keys are equal to each other, that is, whether or not the area of one of the operation keys touched by the operator's finger is wide and the area of another one of the operation keys touched by the operator's finger is narrow, based on a signal, showing a range of the touching by this finger, inputted to the control section 100 through the aforementioned touch panel function (S26B).

For example, as shown in FIG. 16, there is a case where the area of the section 201 touched by the operator's finger on the copy key K1' is wide and the area of the section 202 touched by the operator's finger on the transmit key K2' is narrow. The control section 100, based on the signal, indicating the range of the touching by this finger, inputted to the control section 100 through the aforementioned touch panel function, determines which of the touched areas is wider.

If the control section 100 has judged that the areas touched by the operator's finger on the two operation keys are almost equal to each other (NO in S26B), the control section 100 simultaneously displays, at the display section 473, the two function screens corresponding to these two pressed operation keys with the default priority (S27). For example, the control section 100 displays, at the display section 473, the respective function screens corresponding to the two operation keys with equal display areas.

On the other hand, if the control section 100 has judged that the areas touched by the operator's finger on the two operation keys are different from each other (YES in S26B), the control section 100 displays these two function screens at the display section 473 in a manner such that the function screen corresponding to the operation key with the wide touched area has higher priority than the function screen corresponding to the operation key with the narrow touched area (S28B). For example, the control section 100 displays, at the display section 473, the function screen corresponding to the operation key with the wide touched area in the larger display area than the function screen corresponding to the operation key with the narrow touched area.

As described above, document copying and scanning normally need to be executed as separate jobs, but according to this embodiment, the copy function screen and the transmission function screen are simultaneously displayed, and thus the operator can finish the document copying and saving of a read image through one job.

For example, with the technology disclosed in BACKGROUND, copying and fax transmission can be executed at a time through one document reading, but settings of copy condition such as a number of prints and page editing and settings of facsimile condition such as facsimile transmission destination selection inconveniently are inconveniently required to be made on separate operation screens. On the contrary, with each embodiment described above, an operational feeling upon collective execution of the plurality of functions on the electronic device having the plurality of functions improves.

According to each embodiment described above, upon reach of a state in which the first and second operation keys have been pressed simultaneously, both the first and second function screens are simultaneously displayed at the display section, and thus contents of the settings for the plurality of functions can be collectively inputted on the electronic device having the plurality of functions, thus making it possible to improve the operational feeling upon the collective execution of the plurality of functions.

Note that this disclosure is not limited to the configuration of the embodiment described above and thus various modifications can be made thereto. In the embodiment described above, the multifunction peripheral has been used for the description as one embodiment of the electronic device according to this disclosure, but this is just one example and another electronic device such as a smart phone may be used.

In the embodiment described above, the configuration and processing shown by the embodiment described above with reference to FIGS. 1 through 16 are each just one embodiment of this disclosure, and thus this disclosure is not limited to these configuration and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
   a display section displaying function screens each including a plurality of function setting keys for receiving function settings;
   a first operation key on which an instruction for displaying the first function screen at the display section is inputted;
   a second operation key on which an instruction for displaying the second function screen different from the first function screen at the display section is inputted; and
   a control section displaying, at the display section, the first and second function screens in accordance with the instructions inputted on the first and second operation keys, and receiving, in accordance with operation performed on the function setting keys, instructions corresponding to the function setting keys included on the first and second function screens displayed at the display section,
   wherein the control section simultaneously displays both the first and second function screens at the display section when the first and second operation keys have been pressed simultaneously.

2. The electronic device according to claim 1,
   wherein, when the first and second operation keys have been pressed simultaneously and both the first and second function screens are to be displayed simultaneously at the display section, the control section splits a display screen of the display section and simultaneously displays both the first and second function screens, and also displays the common function setting keys included on the first and second function screens, as the keys for receiving instructions for the respective functions indicated by the first and second function screens, separately from the other function setting keys displayed on the first and second function screens.

3. The electronic device according to claim 1,
   wherein, when the first and second operation keys have been pressed simultaneously and, while either one of the first and second operation keys is continuously pressed for long time, another one of the first and second operation keys has been separated, the control section displays the first and second function screens at the display section by performing, on a display screen of the display section, screen splitting such that a display region of the function screen corresponding to the one operation key is wider than a display region of the function screen corresponding to the another operation key.

4. The electronic device according to claim 1,
   wherein, while either one of the first and second operation keys is continuously pressed for long time, when another one of the first and second operation keys has been pressed, the control section simultaneously displays the first and second function screens by providing semitransparent display of a region other than the function setting keys on the function screen corresponding to the one operation key and then displaying the function screen corresponding to the another operation key in the aforementioned region to thereby display the function screen corresponding to the one operation key appearing at a top and the function screen corresponding to the another operation key appearing at a bottom.

5. The electronic device according to claim 1,
   wherein the control section displays images indicating the first and second operation keys as soft keys at the display section, and the instructions corresponding to the first and second operation keys are inputted to the control section through a touch panel function included in the display section, and
   when the first and second operation keys have been pressed simultaneously, the control section displays the first and second function screens at the display section by determining, based on a signal inputted through the touch panel function, whether or not a touched position of either of the operation keys is close to a middle position of the pressed image and then performing, on a display screen of the display section, screen splitting such that a display region of the function screen corresponding to the operation key whose touched position is close to the middle is wider than a display region of the function screen corresponding to another one of the operation keys.

6. The electronic device according to claim 1,
   wherein the control section displays images indicating the first and second operation keys as soft keys at the display section, and the instructions corresponding to the first and second operation keys are inputted to the control section through a touch panel function included in the display section, and
   when the first and second operation keys have been pressed simultaneously, the control section displays the first and second function screens at the display section by determining, based on a signal inputted through the touch panel function, which of the operation keys has a wider pressed area and then performing, on a display screen of the display section, screen splitting such that a display region of the function screen corresponding to the operation key with the wide pressed area is wider than the function screen corresponding to the operation key with the narrow pressed area.

7. An electronic device comprising:
   a display section displaying function screens each including a plurality of function setting keys for receiving function settings;
   a first operation key on which an instruction for displaying the first function screen at the display section is inputted;
   a second operation key on which an instruction for displaying the second function screen different from the first function screen at the display section is inputted; and
   a control section displaying, at the display section, the first and second function screens in accordance with the instructions inputted on the first and second operation keys, and receiving, in accordance with operation performed on the function setting keys, instructions corresponding to the function setting keys included on the first and second function screens displayed at the display section,
   wherein, while either one of the first and second operation keys has been pressed first, when another one of the operation keys has been pressed, the control section displays the first and second function screens at the display section by performing, on a display screen of the display section, screen splitting such that a display region of the function screen corresponding to the one operation key is wider than a display region of the function screen corresponding to the another operation key.

8. The electronic device according to claim 7,
wherein the control section displays the first and second function screens at the display section by performing, on the display screen of the display section, screen splitting such that a number of the function setting keys on the first and second function screens is smaller than a number of the function setting keys provided upon separate display of the first and second function screens.

9. A computer-readable non-transitory recording medium storing a display control program,
wherein the display control program makes the computer
display, at a display section, function screens each including a plurality of function setting keys for receiving function settings, and display the first and second function screens at the display section in accordance with an instruction inputted to a first operation key on which an instruction for displaying the first function screen at the display section is inputted and an instruction inputted to a second operation key on which an instruction for displaying the second function screen different from the first function screen at the display section is inputted,
receive, in accordance with operation performed on the function setting keys, instructions corresponding to the function setting keys included on the first and second function screens displayed at the display section, and
further perform operation of simultaneously displaying both the first and second function screens at the display section when the first and second operation keys have been pressed simultaneously.

* * * * *